United States Patent Office 3,399,172
Patented Aug. 27, 1968

3,399,172
THERMOPLASTIC CONDENSATION POLY-
MERS TERMINATED WITH PARTICU-
LAR IMIDE GROUPS
Donald B. G. Jaquiss, Lenox, Mass., assignor to General
Electric Company, a corporation of New York
No Drawing. Filed Apr. 19, 1966, Ser. No. 543,518
7 Claims. (Cl. 260—47)

ABSTRACT OF THE DISCLOSURE

Thermoplastic polymers derived from dihydric phenols and consisting of either aromatic carbonate polymers or aromatic ester polymers having as imide terminal groups either

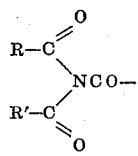

or

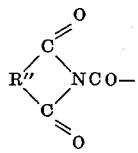

R and R' may be either aryl, aralkyl or aliphatic radicals of 1–10 carbon atoms. R'' is a divalent organic radical of 2–12 carbon atoms. The process for preparing such polymers consists of reacting bisphenol-A, for example, with phosgene and 0.1–10 weight percent of tetrachlorophthalimide, for example.

---

This invention is directed to novel polymers of controlled molecular weight wherein the novel polymers contain imide derivatives as terminal groups.

Therefore, it is an object of this invention to provide novel condensation polymers containing imide derivatives as terminal groups.

Another object of this invention is to provide condensation polymers of controlled molecular weight.

Still another object of this invention is to provide a process for preparing novel condensation polymers of controlled molecular weight.

These and other objects and advantages of this invention will become apparent from the following detailed description thereof.

Briefly, according to this invention, the novel condensation polymers are prepared by carrying out particular polymer condensation reactions in the presence of an imide. The polymers so produced are terminated with imide groups to provide novel polymers of controlled molecular weight.

The following examples are set forth to illustrate more clearly the principle and practice of this invention to those skilled in the art and unless otherwise specified, where parts or percentages are mentioned, they are parts or percentages by weight.

EXAMPLE I

To 300 ml. of methylene chloride containing 56 ml. of pyridine in a reaction flask fitted with a reflux condenser and a stirrer, 45.6 grams of bisphenol-A are added under agitation. While under agitation, the suspended reactants are treated with gaseous phosgene initially at the rate of about 1.0 gram of phosgene per minute and then finally at the rate of about 0.2 gram per minute under reflux conditions. After cooling, the polymer is recovered by precipitation in methanol and dried overnight at 125° C. The polymer has an intrinsic viscosity of 1.09 deciliters per gram as measured in dioxane at 30.0° C. This corresponds to a weight average molecular weight of about 102,400 for the polymer.

EXAMPLE II

Example I is repeated except that 0.708 gram of succinimide is added to the reaction flask.

The resulting polymer has an intrinsic viscosity of 0.81 deciliter per gram as measured in dioxane at 30.0° C. corresponding to a weight average molecular weight of about 65,500.

EXAMPLE III

Example II is repeated except that 2.035 grams of tetrachlorophthalimide are employed herein in place of the 0.703 gram of succinimide.

The resulting polymer has an intrinsic viscosity of 0.86 deciliter per gram as measured in dioxane at 30.0° C., corresponding to a weight average molecular weight of about 71,600.

EXAMPLE IV

Example II is repeated except that 3.15 grams of phthalimide are employed herein in place of the succinimide. The resulting polymer has an intrinsic viscosity of 0.67 deciliter per gram of dioxane at 30.0° C., corresponding to a weight average molecular weight of about 49,400.

The instant invention is directed to condensation polymers having terminal imide groups and wherein the polymers have a controlled weight average molecular weight of about 1,000 to 100,000. The terminal groups of this invention are selected from the group consisting of (a)

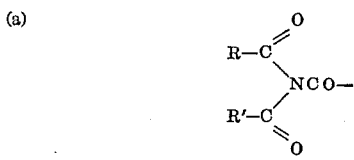

and (b)

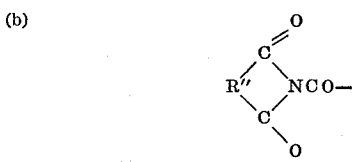

In the above formulae, R and R' are independently selected from the group consisting of aryl, aralkyl and aliphatic radicals of 1–10 carbon atoms, and mixtures thereof, and R'' is a divalent organic radical of 2–12 carbon atoms.

The polymers of this invention are prepared by carrying out the condensation reaction for preparing the polymers in the presence of a monofunctional imide compound. The imide compounds employed herein have the following formulae:

(1)

or (2)

wherein R, R' and R'' all have the meaning set forth previously. Examples of the imide compounds which can be employed herein are succinimide, phthalimide, cyclohexane, 1,2, dicarboximide, tetrabromophthalimide, tetrachlorophthalimide, diactamide, and N-acetylbenzamide. For example, the N-acteylbenzamide is where R is CH₃— and R' is C₆H₅— in the above formula.

The surprising feature of the instant invention is that the imide compounds react with the polymers to provide the novel condensation polymers as described herein having a controlled molecular weight. The novel condensation palymers of this invention contain terminal imide groups. In the practice of this invention, the weight average molecular weight of the polymers can be controlled between 1,000–100,000 depending upon the amount of the imide compound employed. The amount employed herein varies between 0.1–10.0 weight percent based on the total weight of the polymer and preferably 1.0–10.0 weight percent.

As a surprising side feature of the instant invention, it is noted that when employing tetrachlorophthalimide as the molecular weight regulator, the resulting polymer has excellent flame resistance due to the presence of chlorine. Equally advantageous for obtaining flame resistance is the use of tetrabromophthalimide.

In the practice of this invention, the polymers employed to prepare the novel condensation polymers disclosed herein include such polymers as aromatic carbonate polymers, aromatic ester polymers, copolymers of the above and mixtures thereof. The aromatic carbonate polymers employed in the practice of this invention are carbonate homopolymers of dihydric phenols, carbonate copolymers of two different dihydric phenols or copolymers of such dihydric phenols with glycols, e.g., ethylene glycol or propylene glycol; dibasic acids, e.g., isophthalic acid or terephthalic acid, hydroxy acids such as p-hydroxybenzoic acid or hydroxyl or acid-terminated polyesters, e.g., hydroxyl or acid-terminated polyesters of neopentyl glycol and adipic acid and include those disclosed in U.S. Patents 3,030,331 and 3,169,121 which are hereby incorporated by reference. Such aromatic carbonate polymers are prepared by reacting a dihydric phenol with a carbonate precursor which may be either a carbonyl halide, e.g., as carbonyl chloride, carbonyl bromide and carbonyl fluoride or a haloformate, e.g., bishaloformates of dihydroxy aromatic compounds (bischloroformates of hydroquinone, etc.) or glycols (bishaloformates of ethylene glycol, neopentyl-glycol, propylene glycol, etc.). Preferably phosgene is employed to prepare the aromatic carbonate polymers employed in the practice of this invention.

The dihydric phenols which can be employed in place of the bisphenol-A used in the examples to prepare the aromatic carbonate polymers are mononuclear or polynuclear aromatic compounds, containing as functional groups, two hydroxy radicals, each of which is attached directly to a carbon atom of an aromatic nucleus and are hydroquinone, resorcinol, 2,2-bis-(4-hydroxy-3-methylphenyl) - propane, 1,1-bis-(4-hydroxyphenylcyclohexane), 4,4'-dihydroxydiphenyl, 4,4'-dihydroxydiphenyl sulfone, 4,4'-dihydroxydiphenyl ether, 2,6-dihydroxynaphthalene and 1,1-bis-(4-hydroxyphenyl) 2,2,2-trichloroethane. A variety of additional dihydric phenols are also available to provide carbonate polymers and are disclosed in U.S. Patent 2,999,835-Goldberg, incorporated herein by reference. As stated previously, it is, of course, possible to employ two or more different dihydric phenols or a copolymer of a dihydric phenol with a glycol, a hydroxy or an acid-terminated polyester, or a dibasic acid in the event a carbonate copolymer rather than a homopolymer is desired for use in the preparation of the novel aromatic carbonate polymers of this invention.

The method for preparing the aromatic carbonate polymers of this invention, when employing phosgene, involve passing phosgene into a reaction mixture containing a dihydric phenol, for example an acid acceptor such as a tertiary amine and an imide. The acid acceptor may be used undiluted or diluted with inert organic solvents as, for example, methylene chloride, chlorobenzene, or 1,2-dichloroethane. Tertiary amines are advantageous since they are good solvents as well as acid acceptors during the reaction.

The temperature at which the phosgenation reaction proceeds may vary from below 0° C. to above 100° C. The reaction proceeds satisfactorily at temperatures from room temperature (25° C.) to 50° C. Since the reaction is exothermic, the rate of phosgene addition may be used to control the reaction temperature. The amount of phosgene required will generally depend upon the amount of dihydric phenol present. Generally speaking, one mole of phosgene will react with one mole of the dihydric phenol used to provide the polymer and two moles of HCl. Two moles of HCl are in turn "attached" by the acid acceptor present. The foregoing are herein referred to as stoichiometric or theoretical amounts.

The aromatic ester polymers employed in the practice of this invention are those polyesters prepared from reacting the diacid chloride of the aromatic dibasic acid with aromatic dihydroxy compounds such as dihydroxy benzene or bisphenol-A. The reaction is carried out in a tertiary amine medium with or without an organic solvent such as ethylene chloride, chlorobenzene, etc., which process is well known to those skilled in the art. Examples of aromatic ester polymers which can be employed in place of the carbonate polymers in the examples are poly bisphenol-A isophthalate, poly hydroquinone terephthalate and poly 2,6 naphthalene diol isophthalate. The results obtained are essentially the same as obtained in the examples.

As stated previously, the process of this invention is one wherein the condensation polymer reaction is carried out in the presence of an imide compound of the formula:

(1)
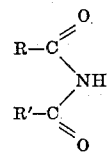

or (2)
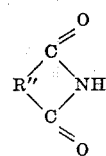

wherein R, R' and R'' all have the meaning as set forth previously. The process for carrying out the condensation polymer reaction is as set forth above in the description of each one of the particular aromatic carbonate polymers, aromatic ester polymers and aromatic sulfone-ether polymers. Generally in the practice of this invention, it is preferred to prepare a carbonate polymer employing tetrachlorophthalimide as a molecular weight regulator. Also, as indicated previously, the condensation reaction is carried out in the presence of 0.1–10.0 weight percent of the molecular weight regulator based on the total weight of the polymer.

It is also interesting to note that the imide compounds employed in the practice of this invention can be reacted directly with phosgene. This is certainly indicative of the fact that the imide compound reacts with the polymer to form the novel polymers set forth herein. For example, phthalimide is dissolved in pyridine and treated with phosgene. The temperature rose from about 25° C. to about 55° C. After cooling, the resulting compound is recovered by precipitation in water. The resulting compound has a melting point of about 268° C. The resulting compound is N,N'-carbonyl diphalimide of the following formulae:

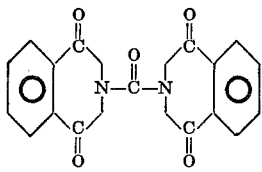

Similar results are obtained when reacting tetrachlorophthalimide with phenyl chloroformate. For example, tetrachlorophthalimide is dissolved in pyridine and treated with phenyl chloroformate at about 110° C. Precipitation occurs and is recovered in water and recrystallized in xylene. The resulting compound is phenyl 3,4,5,6, tetrachloro 1,3-dioxoisoindoline N-carboxylate having a melting point of about 218° C. These products so produced are valuable intermediates for preparing other compounds, dyestuffs, etc.

The novel polymers of this invention find wide use as molding materials and sheet and film products.

It will thus be seen that the objects set forth above, among those made apparent from the preceding description, are efficiently attained, and since certain changes may be made in carrying out the above process and the composition set forth without departing from the scope of the invention, it is intended that all matters contained in the above description shall be interpreted as illustrative and not in a limiting sense.

What is claimed is:

1. A novel thermoplastic condensation polymer derived from dihydric phenols and selected from the group consisting of aromatic carbonate polymers, aromatic ester polymers, copolymers thereof and mixtures thereof wherein the thermoplastic condensation polymers contain terminal groups selected from the group consisting of (a)

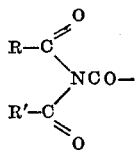

and (b)

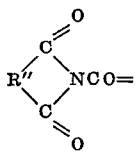

wherein R and R' are independently selected from the group consisting of aryl, aralkyl and aliphatic radicals of 1–10 carbon atoms and mixtures thereof, and R" is a divalent organic radical of 2–12 carbon atoms.

2. The composition of claim 1 wherein the terminal groups have the following formula:

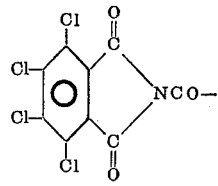

3. The composition of claim 1 wherein the aromatic polymer is a polymer of a dihydric phenol and a carbonate precursor.

4. The composition of claim 1 wherein the aromatic carbonate polymer is a polymer of bisphenol-A and a carbonyl halide.

5. A process for preparing a thermoplastic condensation polymer having terminal imide groups and a controlled average molecular weight of 1,000–100,000, which process consists of carrying out the condensation reaction in the presence of 0.1–10.0 weight percent based on the total weight of the polymer of a molecular weight regulator selected from the group consisting of (1)

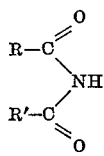

and (2)

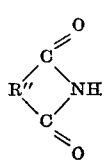

wherein R and R' are independently selected from the group consisting of aryl, aralkyl, alkaryl and aliphatic radicals of 1–10 carbon atoms and R" is a divalent organic radical of 2–12 carbon atoms; said thermoplastic condensation polymers being derived from dihydric phenols and being selected from the group consisting of aromatic carbonate polymers, aromatic ester polymers, copolymers thereof, and mixtures thereof.

6. The process of claim 5 wherein the molecular weight regulator is tetrachlorophthalimide.

7. The process of claim 5 wherein the aromatic carbonate polymer is prepared by reacting bisphenol-A with phosgene.

No references cited.

MURRAY TILLMAN, *Primary Examiner.*

PAUL LIEBERMAN, *Assistant Examiner.*